Patented Nov. 29, 1932

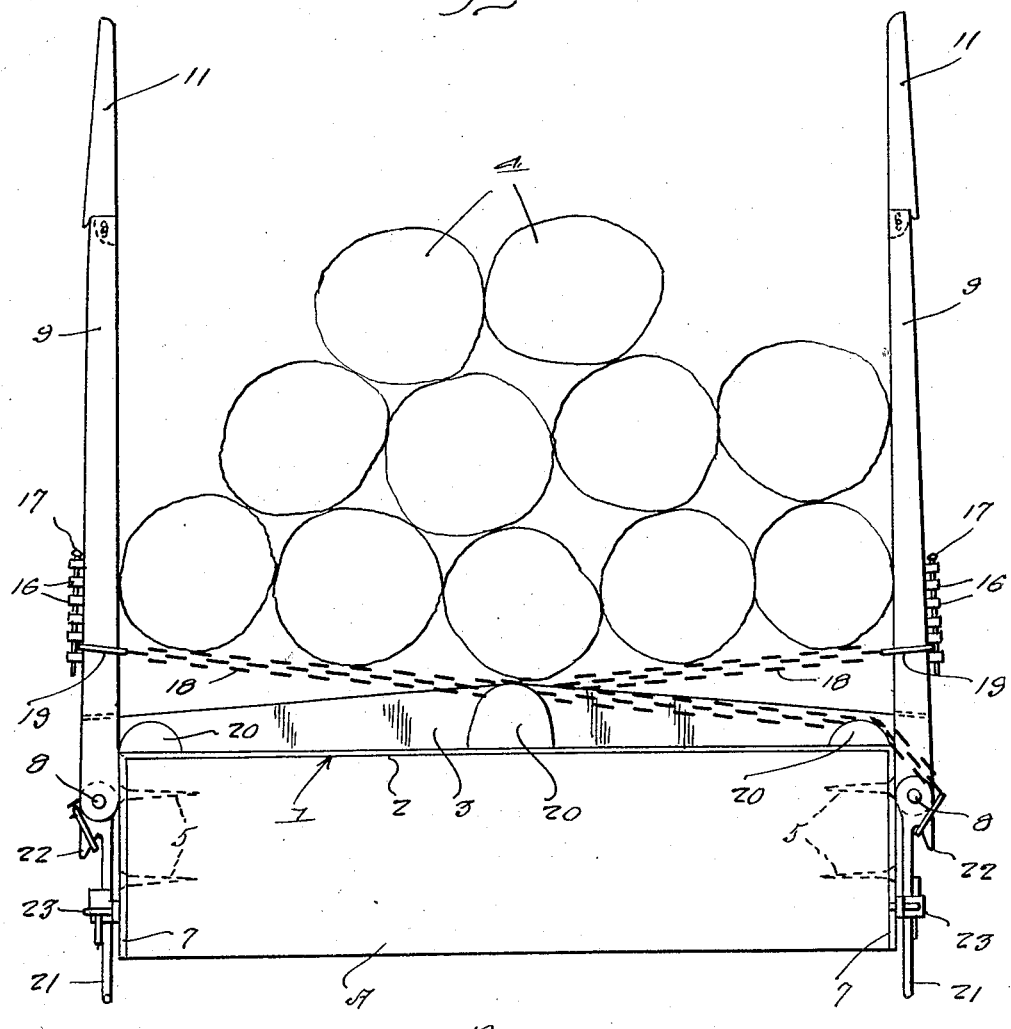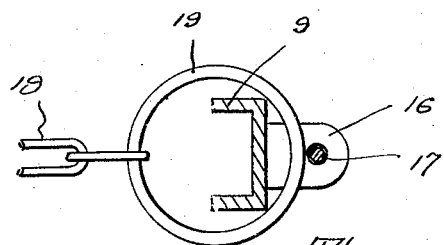

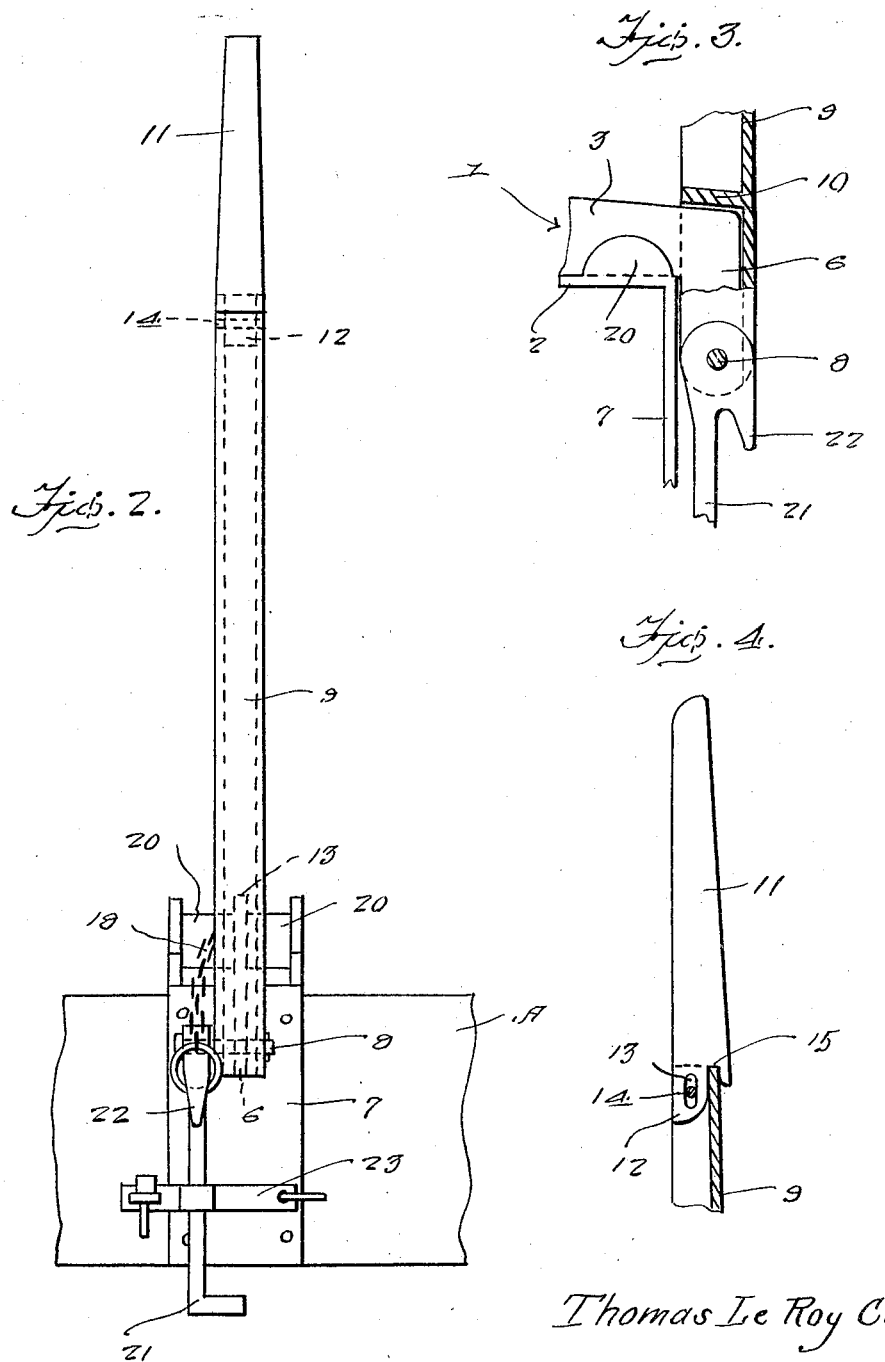

1,888,973

UNITED STATES PATENT OFFICE

THOMAS LE ROY COOPER, OF CLOQUET, MINNESOTA

LOG RETAINING AND UNLOADING DEVICE

Application filed August 31, 1931. Serial No. 560,484.

The present invention relates to a log retaining and unloading device for railroad flat cars and other vehicles and has for one of its important objects to provide, in a manner as hereinafter set forth, a device of this character embodying a novel construction, combination and arrangement of parts through the medium of which logs may be piled on the car in a secure manner and without the use of skilled labor and unloaded from said car on either side thereof in an expeditious manner.

Other objects of the invention are to provide a log retaining and unloading device of the character described which will be simple in construction, strong, durable, efficient and reliable in operation and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in end elevation of a freight car showing a log retaining and unloading device in accordance with this invention mounted in operative position thereon.

Figure 2 is a view in side elevation of the device.

Figure 3 is a detail view partially in side elevation and partially in section showing the means for hingedly mounting a stake and the chain tightening levers on the bunk.

Figure 4 is a detail view showing the means for hingedly connecting the extensions to the upper ends of the stakes.

Figure 5 is a detail view in horizontal section through one of the stakes showing the means for connecting the chains thereto.

Referring now to the drawings in detail, it will be seen that the reference character A designates a body of a freight car. Of course, the body A may be that of a motor truck or other vehicle if desired.

The device constituting the present invention comprises a bunk designated generally by the reference numeral 1, said bunk being of substantially inverted T-shaped cross section and including a base 2 from which rises a web or flange 3 having an anticlinal upper edge. Any desired number of the bunks 1 may be mounted on the freight car A. The bunks are mounted transversely on the car and are preferably spaced to be disposed to meet the end portions of the logs which are designated by the reference numeral 4.

The base 2 of the bunk 1 has its end portions turned downwardly against the sides of the car body and secured thereto by suitable means such as the anchoring screws 5. The webs 3 of the bunk 1 project beyond the sides of the car body and have formed integrally therewith the hangers 6. The depending portions of the base 2 through which the anchoring screws 5 pass are designated by the reference numeral 7.

The hangers 6 are each provided with an opening in the lower portion thereof for the passage of the bolts 8 the ends of which projects from opposite sides of the hanger. Mounted for swinging movement on the bolts 8 are the stakes 9 of substantially U-shaped cross section having in their lower portions the bearing plates 10 (see Figure 3) for engagement on the end portions of the webs 3 when the stakes are in raised or operative position for relieving the pivot bolts 8 from excessive strain. Extensions 11 are hingedly mounted for swinging movement on the upper ends of the stakes 9 and are provided with tongues 12 extending into the channels of the stakes from the upper ends thereof, said tongues being provided with longitudinal slots 13 for the passage of the bolts 14 which traverse the stakes 9. The extensions 11 are further provided with notches for recesses 15 adjacent the tongues 12 for the reception of the upper end portions of the webs or connecting portions of the stakes 9. In this manner what constitutes a substantially half hinge joint is provided for the extensions 11 which will permit said extensions to swing in one direction out of longitudinal alignment with the stakes 9 but which will prevent swinging movement of said extensions in the opposite directions. Thus, when the stakes are swung downwardly in a manner to be presently described for the purpose of unloading the logs 4, the extensions 11, should they engage the ground, will be permitted to swing, thus preventing damage to said extensions or the stakes.

On their outer sides and on the lower portions thereof, the stakes 9 are provided with series of lugs 16 having aligned openings therein for the passage of a pin 17. Chains 18 have one end secured for vertical adjustment to the stakes 9 through the medium of rings 19 which encircle the stakes between any of the lugs 16. The lugs 16 and the pins 17 constitute means for retaining the rings 19 in adjusted position on the stakes 9. The chains 18 extend downwardly across the car body from their respective stakes and on opposite sides of the web 3 of the bunk 1. Guide blocks 20 are provided on the base 2 of the bunk 1 on opposite sides of the web 3 over which the chains 18 travel. The guide blocks 20 are rounded to permit the chains to readily slide thereover.

Tightening levers 21 are mounted for swinging movement on the bolts 8 adjacent the stakes 9 and said levers are provided with hooks 22 for engagement with the free ends of the chains 18 for drawing said chains taut and for anchoring said free ends of the chains. Suitable securing means 23 are provided for retaining the levers 21 in operative position.

In use, the stakes 9 are supported in upright position against outward pressure by the piled logs 4 by the chains 18. By adjusting the rings 19 vertically on the stakes 9 the tension of the chains 18 when the levers 21 are swung downwardly to operative position may be regulated. When it is desired to unload the logs 4 on either side of the car, the lever 21 which is on the opposite side of the car is released and swung upwardly to permit the stakes 9 on the side of the car from which the logs are to be unloaded to swing outwardly and downwardly, thereby permitting the logs to roll down the anticlinal upper edges of the webs 3 of the bunks 1. It will be noted that the person who releases the levers 21 will do so while standing on the opposite side of the car to that on which the logs are to be unloaded, thus materially promoting safety. The weight of the logs on the chains 18 will pull the stakes 9 inwardly.

It is believed that the many advantages of a log retaining end unloading device constructed in accordance with this invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:—

1. A log retaining and unloading device for vehicles comprising a bunk mounted transversely on the vehicle body, stakes pivotally mounted for swinging movement in a vertical plane on the end portions of the bunk, chains connected, at one end, to the stakes and extending therefrom across the vehicle body, and means on the vehicle body for detachable connection with the other ends of the chains for tightening said chains and securing the stakes in an upright position.

2. A log retaining and unloading device for vehicles comprising a bunk mounted transversely on the vehicle body, said bunk including a base and an unstanding flange formed integrally with the base and having an anticlinal upper edge, stakes pivotally mounted for swinging movement in a vertical plane on the end portions of the bunk, chains extending transversely across the vehicle above the bunk, means for adjustably connecting one end of the chains to intermediate portions of the stakes, levers pivotally mounted for swinging movement on the end portions of the bunk and engageable with the other ends of the chains for tightening said chains and securing the stakes in an upright position.

3. A log retaining and unloading device for vehicles comprising a bunk mounted transversely on the vehicle body, said bunk including a base and an upstanding flange formed integrally with the base and having an anticlinal upper edge, stakes pivotally mounted for swinging movement in a vertical plane on the end portions of the bunk, chains extending transversely across the vehicle above the bunk, means for adjustably connecting one end of the chains to intermediate portions of the stakes, levers pivotally mounted for swinging movement on the end portions of the bunk and engageable with the other ends of the chains for tightening said chains and securing the stakes in an upright position, and guide blocks mounted on the base on opposite sides of the web of the bunk over which the chains are operable.

4. A log retaining and unloading device for vehicles comprising a bunk mounted transversely on the vehicle body, said bunk including a base and an upstanding web having an anticlinal upper edge, the end portions of the base being turned downwardly and secured to the sides of the vehicle body, the end portions of the web projecting laterally beyond the vehicle body, integral hangers on the projecting end portions of the web, bolts extending transversely through the hangers, stakes mounted for swinging movement on the bolts and adapted for vertical dispositon, and means for releasably securing the stakes in a vertical position.

5. A log retaining and unloading device for vehicles comprising a bunk mounted transversely on the vehicle body, said bunk including a base and an upstanding web having an anticlinal upper edge, the end portions of the base being turned downwardly and secured to the sides of the vehicle body, the end portions of the web projecting laterally beyond the vehicle body, integral hangers on the projecting end portions of the web, bolts extending transversely through the hangers, stakes mounted for swinging movement on the bolts and adapted for vertical disposition, and means for releasably securing the stakes in a vertical position, said means including chains extending transversely across the vehicle body above the bunk, means adjustably connecting one end of the chains to intermediate portions of the stakes, and means on opposite sides of the car body operatively engageable with the other ends of the chains for tightening said chains and for pulling inwardly on the stakes.

6. A log retaining and unloading device for vehicles comprising a bunk mounted transversely on the vehicle body, said bunk including a base and an upstanding web having an anticlinal upper edge, the end portions of the base being turned downwardly and secured to the sides of the vehicle body, the end portions of the web projecting laterally beyond the vehicle body, integral hangers on the projecting end portions of the web, bolts extending transversely through the hangers, stakes mounted for swinging movement on the bolts and adapted for vertical disposition, and means for releasably securing the stakes in a vertical position, said means including chains extending transversely across the vehicle body above the bunk, means adjustably connecting one end of the chains to intermediate portions of the stakes, and means on opposite sides of the car body operatively engageable with the other ends of the chains for tightening said chains and for pulling inwardly on the stakes, the last named means comprising levers mounted for swinging movement in a vertical plane on the bolts, and hooks on the levers engageable with said other ends of the chains.

7. A log retaining and unloading device for vehicles comprising a bunk mounted transversely on the vehicle body, said bunk including a base and an upstanding web having an anticlinal upper edge, the end portions of the base being turned downwardly and secured to the sides of the vehicle body, the end portions of the web projecting laterally beyond the vehicle body, integral hangers on the projecting end portions of the web, bolts extending transversely through the hangers, stakes mounted for swinging movement on the bolts and adapted for vertical disposition, and means for releasably securing the stakes in a vertical position, said means including chains extending transversely across the vehicle body above the bunk, means adjustably connecting one end of the chains to intermediate portions of the stakes, and means on opposite sides of the car body operatively engageable with the other ends of the chains for tightening said chains and for pulling inwardly on the stakes, the last named means comprising levers mounted for swinging movement in a vertical plane on the bolts, and hooks on the levers engageable with said other ends of the chains, and guide blocks mounted on the base of the bunk on opposite sides of the web over which the chains are operable.

8. A log retaining and unloading device for vehicles comprising a bunk mounted transversely on the vehicle body, said bunk including a base and an upstanding web formed integrally with the base, said web having an anticlinal upper edge, the end portions of the base extending downwardly on the sides of the vehicle body and secured thereto, the end portions of the web projecting laterally beyond the vehicle body, hangers formed integrally with the projecting end portions of the web, stakes of substantially U-shaped cross section having their lower end portions straddling the hangers, bolts extending through the stakes and hangers for mounting said stakes thereon for swinging movement in a vertical plane, bearing plates in the stakes engageable with the end portions of the web for supporting the stakes thereon when said stakes are in operative position, and means for releasably securing the stakes in operative position.

9. A log retaining and unloading device for vehicles comprising a bunk mounted transversely on the vehicle body, said bunk including a base and an upstanding web formed integrally with the base, said web having an anticlinal upper edge, the end portions of the base extending downwardly on the sides of the vehicle body and secured thereto, the end portions of the web projecting laterally beyond the vehicle body, hangers formed integrally with the projecting end portions of the web, stakes of substantially U-shaped cross section having their lower end portions straddling the hangers, bolts extending through the stakes and hangers for mounting said stakes thereon for swinging movement in a vertical plane, bearing plates in the stakes engageable with the end portions of the web for supporting the stakes thereon when said stakes are in operative position, and means for releasably securing the stakes in operative position, said means comprising chains extending transversely of the vehicle body above the bunk, means for adjustably connecting one end of the chains to intermediate portions of the stakes, levers mounted for swinging movement in a vertical plane on the bolts adjacent the pivoted ends of the stakes, hooks on the levers engageable with the other ends of the chains, said hooks and the levers constituting means for tightening the chains, means for releasably securing the levers against swinging movement and in operative position.

10. A log retaining and unloading device for vehicles comprising a bunk mounted transversely on the vehicle body, said bunk including a base and an upstanding web formed integrally with the base, said web having an anticlinal upper edge, the end portions of the base extending downwardly on the sides of the vehicle body and secured thereto, the end portions of the web projecting laterally beyond the vehicle body, hangers formed integrally with the projecting end portions of the web, stakes of substantially U-shaped cross section having their lower end portions straddling the hangers, bolts extending through the stakes and hangers for mounting said stakes thereon for swinging movement in a vertical plane, bearing plates in the stakes engageable with the end portions of the web for supporting the stakes thereon when said stakes are in operative position, and means for releasably securing the stakes in operative position, said means comprising chains extending transversely of the vehicle body above the bunk, means for adjustably connecting one end of the chains to intermediate portions of the stakes, levers mounted for swinging movement in a vertical plane on the bolts adjacent the pivoted ends of the stakes, hooks on the levers engageable with the other ends of the chains, said hooks and the levers constituting means for tightening the chains, means for releasably securing the levers against swinging movement and in operative position, and guides mounted on the base of the bunk on opposite sides of the web over which the chains are slidable.

In testimony whereof I affix my signature.

THOMAS LE ROY COOPER.